(12) United States Patent
Ohchi et al.

(10) Patent No.: US 7,044,545 B2
(45) Date of Patent: May 16, 2006

(54) VEHICLE SEAT

(75) Inventors: Masato Ohchi, Toyota (JP); Kenichi Takenaka, Chiryu (JP); Hiroshi Tamura, Toyota (JP); Hiroyoshi Yamaguchi, Yokohama (JP); Makoto Hasegawa, Yokohama (JP); Takeshi Itoh, Yokohama (JP)

(73) Assignees: Toyota Jidosha Kabushiki Kaisha, Toyota (JP); NHK Spring Co., Ltd., Yokohama (JP)

( * ) Notice: Subject to any disclaimer, the term of this patent is extended or adjusted under 35 U.S.C. 154(b) by 0 days.

(21) Appl. No.: 11/143,451

(22) Filed: Jun. 3, 2005

(65) Prior Publication Data

US 2005/0280296 A1   Dec. 22, 2005

(30) Foreign Application Priority Data

Jun. 22, 2004   (JP) .............................. 2004-184131

(51) Int. Cl.
*B60N 2/42* (2006.01)

(52) U.S. Cl. ................................. 297/216.12
(58) Field of Classification Search ........... 297/216.12, 297/391, 408, 410
See application file for complete search history.

(56) References Cited

U.S. PATENT DOCUMENTS

| 5,823,619 | A | * | 10/1998 | Heilig et al. ........... 297/216.12 |
| 5,882,071 | A | * | 3/1999 | Fohl ....................... 297/216.12 |
| 6,082,817 | A | * | 7/2000 | Muller ......................... 297/391 |
| 6,273,511 | B1 | * | 8/2001 | Wieclawski ............... 297/463.1 |
| 6,550,856 | B1 | * | 4/2003 | Ganser et al. .............. 297/408 |
| 6,572,186 | B1 | * | 6/2003 | Fischer et al. ......... 297/216.12 |
| 6,824,212 | B1 | * | 11/2004 | Malsch et al. .............. 297/408 |
| 2002/0195846 | A1 | * | 12/2002 | Masuda et al. ......... 297/216.12 |

FOREIGN PATENT DOCUMENTS

JP     A 2001-163099     6/2001

* cited by examiner

*Primary Examiner*—Peter R. Brown
(74) *Attorney, Agent, or Firm*—Oliff & Berridge, PLC

(57) ABSTRACT

When a vehicle is rear-ended and a seated user moves rearward in reaction to the rear-end collision, a load generated by a rearward movement of a lumbar portion of the seated user is transmitted from a pressure plate of operating force generating means to an operating force generating mechanism. Then, a pressure roller of the operating force generating mechanism deflects and pulls inner cables of pulling cable devices, thereby moving both end portions of a headrest frame upward. As a result, the headrest frame is moved upward along with headrest supporting brackets smoothly and reliably, whereby a headrest attached to the headrest supporting brackets with headrest stays arranged between the headrest and the respective headrest supporting brackets is moved in the upward-forward direction, that is, toward the head of the seated user smoothly and reliably.

7 Claims, 14 Drawing Sheets

VEHICLE SEAT

INCORPORATION BY REFERENCE

The disclosure of Japanese Patent Application No. 2004-184131 filed on Jun. 22, 2004 including the specification, drawings and abstract is incorporated herein by reference in its entirety.

BACKGROUND OF THE INVENTION

1. Field of the Invention

The invention relates to a vehicle seat in which a headrest is attached to a seat back.

2. Description of the Related Art

Usually, a headrest is attached to a seat back of a vehicle seat, in order to protect the head of a seated user in the event that the vehicle is rear-ended. The headrest is usually arranged at a position that is slightly apart from the head of the seated user in the rearward direction such that the head of the seated user is prevented from inappropriately contacting the head rest when the vehicle is driven.

Japanese Patent Application Publication No. JP(A) 2001-163099 discloses a known vehicle seat of the above-mentioned type. According to the technology disclosed in Japanese Patent Application Publication No. JP(A) 2001-163099, when a vehicle is rear-ended and the upper body of a seated user moves rearward in reaction to the rear-end collision, a load generated by this rearward movement is transmitted to right and left headrest holders (headrest supporting brackets) and therefore a headrest is moved upward while being tilted forward, whereby the head and the neck of the seated user are protected.

In the vehicle seat disclosed in Japanese Patent Application Publication No. JP(A) 2001-163099, passive means for transmitting the load generated by the rearward movement of the upper body of the seated user to the right and left headrest holders is formed mainly of a belt provided in a center portion of a seat back, which is located between the right and left headrest holders. The load generated by the rearward movement of the upper body of the seated user is transmitted to the right and left headrest holders via the belt provided in the center portion. Therefore, the loads received by the right and left headrest holders are likely to be unequal. As a result, the situation may be caused in which the headrest is tilted in an undesired direction, and cannot be smoothly moved upward while being tilted forward.

If the width of the belt is increased such that the ends of the belt are located near the right and left headrest holders, undesired tilting of the headrest might be prevented. However, an increase in the belt width causes other problems such as an increase in cost and an increase in weight.

SUMMARY OF THE INVENTION

It is an object of the invention to provide a vehicle seat in which a headrest can be moved toward the head of a seated user smoothly and reliably, when the vehicle is rear-ended.

According to a first aspect of the invention, there is provided a vehicle seat, including a seat back frame; headrest supporting brackets which are provided in a center portion of the seat back frame, and to which a headrest is attached; a headrest frame which is supported by the seat back frame at at least two coupling portions such that the headrest is movable in a direction in which the headrest is moved closer to a head of a seated user; an operating force generating device which generates an operating force when receiving a load generated by a rearward movement of the seated user; and an operating force transmitting device which applies the operating force to the at least two coupling portions of the headrest frame in accordance with an operation of the operating force generating device, thereby moving the headrest frame.

In the vehicle seat according to the first aspect, when the vehicle is rear-ended and the seated user moves rearward in reaction to the rear-end collision, the operating force generating device generates the operating force by receiving the load generated by the rearward movement of the seated user, and the operating force transmitting device moves both end portions of the headrest frame in accordance with the operation of the operating force generating device. As a result, the headrest frame is moved along with the headrest supporting brackets smoothly and reliably, whereby the headrest attached to the headrest supporting brackets with headrest stays arranged between the headrest and the headrest supporting brackets is moved toward the head of the seated user smoothly and reliably.

In the first aspect, the coupling portions may be provided at respective end portions of the headrest frame.

In the first aspect, a direction in which the headrest frame is moved may be an upward direction. The direction in which the headrest frame is moved is basically the upward direction. Preferably, the direction in which the headrest frame is moved is an upward-forward direction.

In the first aspect, guide portions that guide the headrest frame in a direction in which the headrest frame is moved may be formed in the respective coupling portions.

In the first aspect, the operating force transmitting device may be formed of paired pulling cable devices. Preferably, the operating force transmitting device which moves the both end portions of the headrest frame is formed of paired lightweight pulling cable devices which can be easily arranged in the seat back.

In the first aspect, the operating force generated by the operating force generating device may be converted into a pulling force by the paired pulling cable devices.

In the first aspect, the pulling cable devices may be routed such that the pulling cable devices cross each other, and each of the pulling cable devices is arranged in a shape with a gentle curvature. If the pulling cable devices are routed such that the pulling cable devices cross each other, and each of the pulling cable devices is arranged in a shape with a gentle curvature, the pulling cable devices can be operated smoothly.

In the first aspect, guide portions that guide the headrest frame in a direction in which the headrest frame is moved may be formed in the respective coupling portions and each of one end portions of outer sheaths of the paired pulling cable devices, the one end portions facing respective end portions of the headrest frame, may be positioned on an extension of a line that extends in a direction in which the guide portion guides the headrest frame in a direction in which the headrest frame is moved are formed in the respective coupling portions. In the case where the guide portions that guide the headrest frame in the direction in which the headrest frame is moved are formed in the respective coupling portions, when each of the one end portions of the outer sheaths of the paired pulling cable devices, the one end portions facing the respective end portions of the headrest frame, is positioned on the extension of the line that extends in the direction in which the guide portion guides the headrest frame, the paired pulling cable devices can move the both end portions of the headrest frame smoothly.

With the vehicle seat according to the first aspect, when the vehicle is rear-ended and the seated user moves rearward in reaction to the rear-end collision, the operating force generating device receives the load generated by this rearward movement and therefore generates an operating force. In accordance with this operation, the operating force transmitting device moves the both end portions of the headrest frame. As a result, the headrest frame is moved along with the headrest supporting brackets smoothly and reliably, and the headrest attached to the headrest supporting brackets with the headrest stays arranged between the headrest and the headrest supporting brackets is moved toward the head of the seated user smoothly and reliably. Therefore, according to the invention, when the vehicle is rear-ended, the headrest can be moved toward the head of the seated user smoothly and reliably. It is therefore possible to reliably reduce an impact on the neck of the seated user.

When the operating force transmitting device is formed of the paired pulling cable devices, the both end portions of the headrest frame can be moved smoothly and reliably. Also, flexibility in arrangement of the operating force transmitting device in the seat back is increased, and an increase in the weight of the operating force transmitting device can be minimized.

According to a second aspect of the invention, there is provided a vehicle seat, including a seat back frame; headrest supporting brackets which are provided in a center portion of the seat back frame, and to which a headrest is attached; a headrest frame which is supported by the seat back frame at at least two coupling portions such that the headrest is movable in a direction in which the headrest is moved closer to a head of a seated user; operating force generating means for generating an operating force when receiving the load generated by a rearward movement of the seated user; and operating force transmitting means for applying the operating force to the at least two coupling portions of the headrest frame in accordance with an operation of the operating force generating means, thereby moving the headrest frame.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE EXEMPLARY EMBODIMENTS

Figure 1:
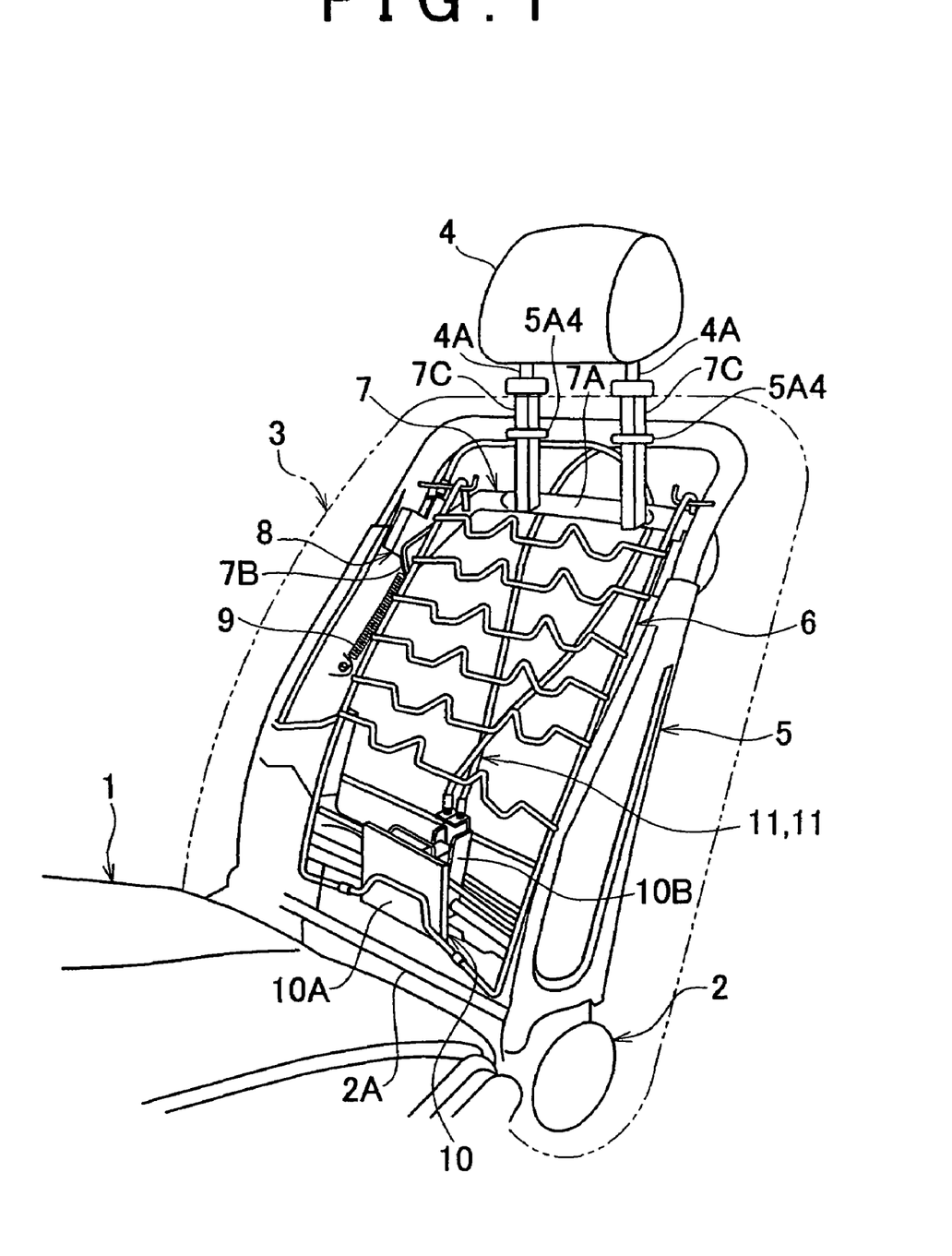
FIG. 1 is a perspective view showing a main portion of a vehicle seat according to a first embodiment of the invention.

Hereafter, a vehicle seat according to an embodiment of the invention will be described with reference to accompanying drawings. FIG. 1 is a perspective view showing a structure of a main portion of a vehicle seat according to a first embodiment of the invention.

As shown in FIG. 1, the vehicle seat according to the first embodiment includes a seat back 3 that is coupled with a rear portion of a seat cushion 1 so as to be tiltable forward/rearward using a tilting mechanism 2. A headrest 4 is detachably attached to an upper portion of the seat back 3 with headrest stays 4A, 4A arranged between the headrest 4 and the seat back 3.

Figure 2:
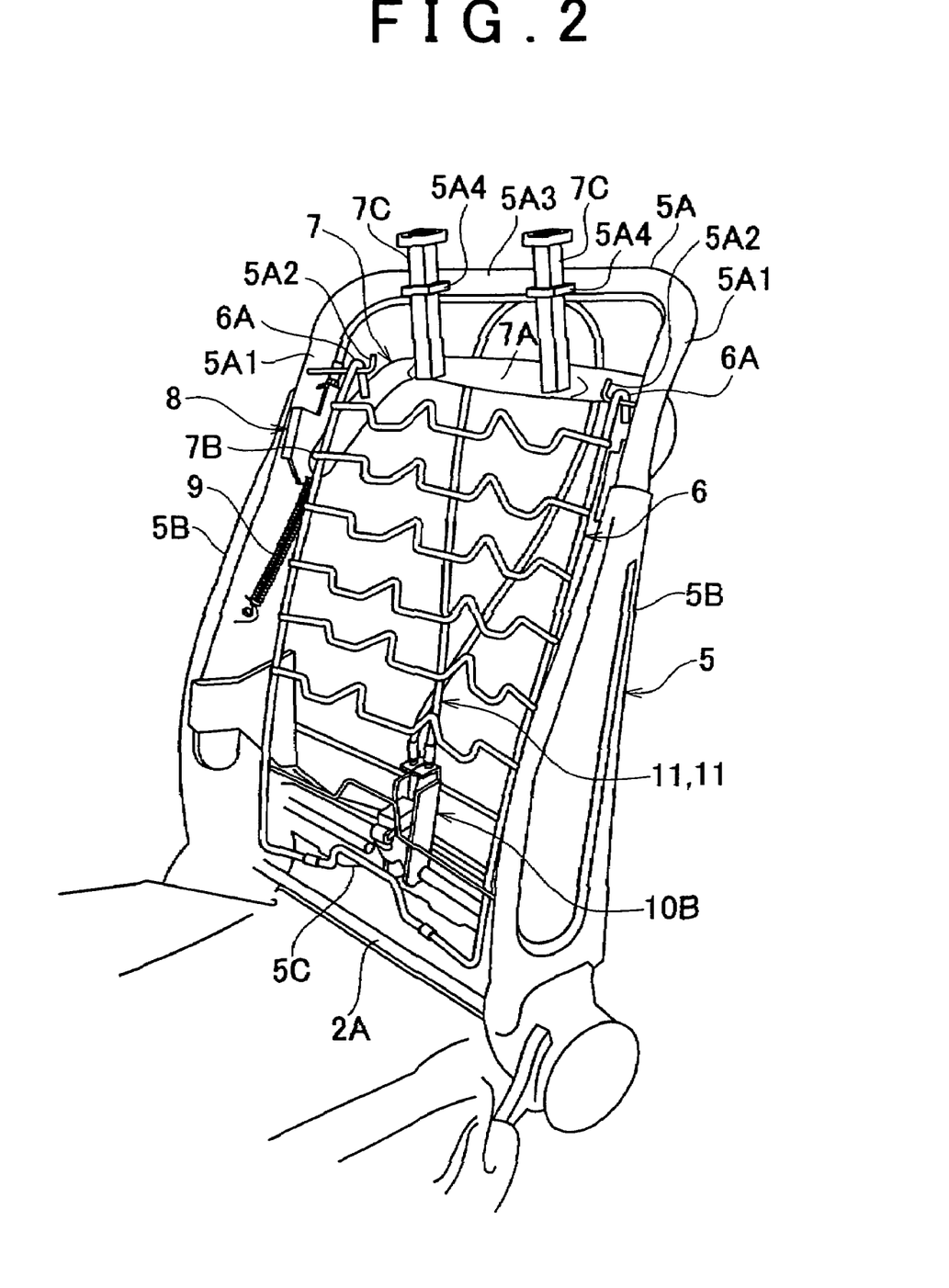
FIG. 2 is a perspective view showing an inner structure of a seat back in FIG. 1.
Figure 3:
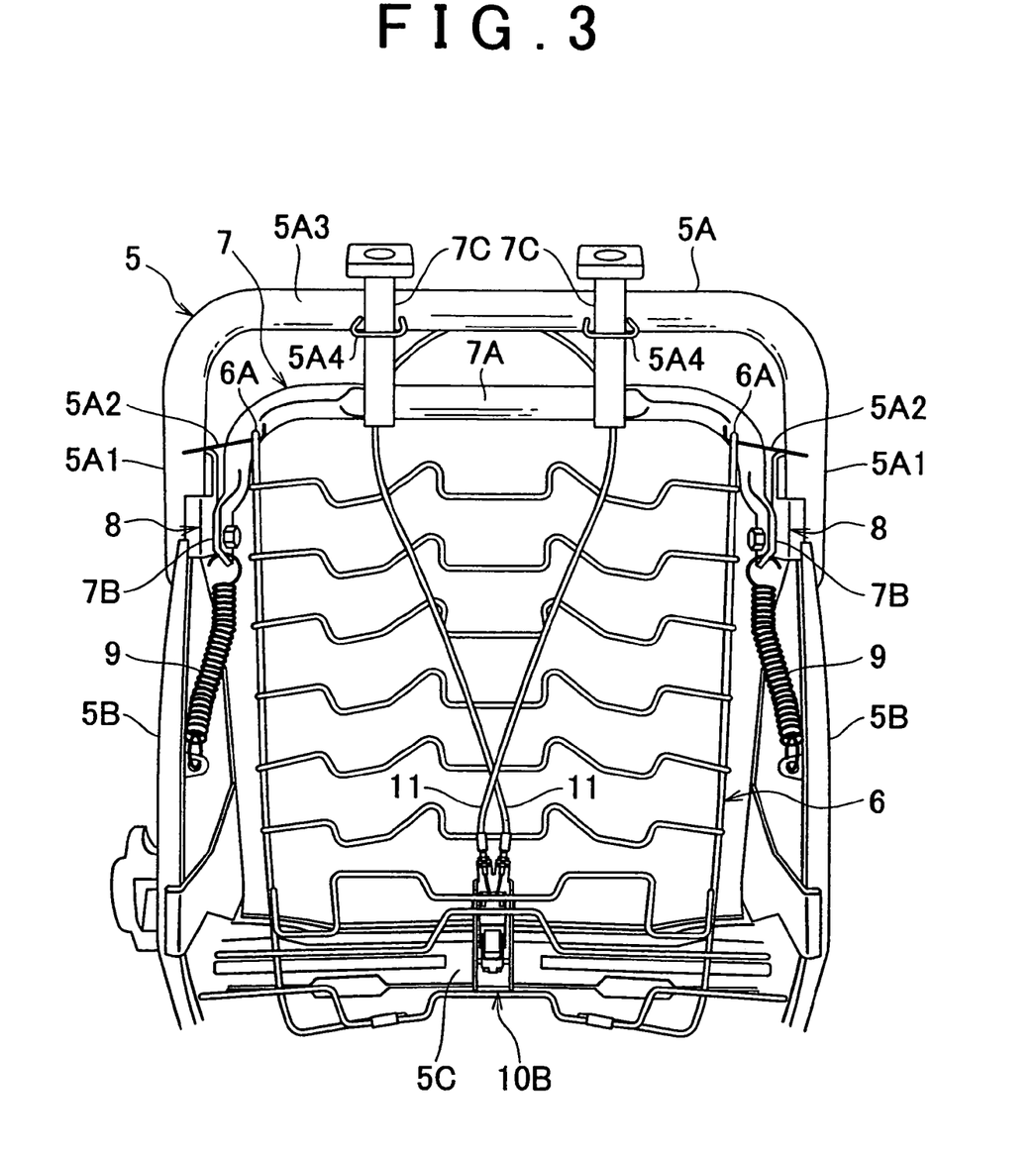
FIG. 3 is a front view showing the inner structure of the seat back in FIG. 2.

In the seat back 3, a seat back frame 5, which is a frame of the seat back 3, is embedded in a seat back pad (not shown) formed of a cushion material, for example, urethane foam. As shown in FIGS. 2 and 3, the seat back frame 5 is formed by connecting an upper pipe 5A, right and left side frames 5B, 5B, and a lower frame 5C integrally with each other by welding. The upper pipe 5A has a portal shape viewed from the front, which is formed by bending. The upper pipe 5A is an upper portion of the seat back frame 5. The lower frame 5C has a strip shape. The lower frame 5C is a lower portion of the seat back frame 5. Lower end portions of the side frames 5B, 5B of the seat back frame 5 are tiltably connected to a pivot 2A of the tilting mechanism 2.

A contour mat 6 is provided inside the seat back frame 5. The contour mat 6 is an elastic mat having a flat shape. The contour mat 6 is formed of wires, for example, piano wires. Engagement hooks 6A, 6A for attaching the contour mat 6 to the seat back frame 5 are formed. One of the engagement hooks 6A, 6A is formed in a right upper portion of the contour mat 6, and the other engagement hook 6A is formed in a left upper portion of the contour mat 6. Support rods 5A2, 5A2, each of which protrudes inward and each of whose end is bent upward, are formed. One of the support rods 5A2, 5A2 is attached to one of vertical pipe portions 5A1, 5A1 of the upper pipe 5A. The other support rod 5A2 is attached to the other vertical pipe portion 5A1 of the upper pipe 5A. The vertical pipe portions 5A1, 5A1 extend in the vertical direction. The engagement hooks 6A, 6A are hooked on the respective support rods 5A2, 5A2 such that the upper portion of the contour mat 6 is supported by the seat back frame 5.

As shown in FIGS. 1 to 3, a headrest frame 7, to which the headrest 4 is attached, is arranged in an upper area inside the seat back frame 5. The headrest frame 7 is formed of a pipe member that has a portal shape viewed from the front, which is formed by bending. In the headrest frame 7, a center portion 7A of a portion extending in the horizontal direction, a lower end portion 7B of a right portion extending in the vertical direction, and a lower end portion 7B of a left portion extending in the vertical direction are pressed so as to be flat (refer to FIG. 3). Paired headrest supporting brackets 7C, 7C are attached to a front surface of the center portion 7A of the headrest frame 7 by welding.

Figure 4:
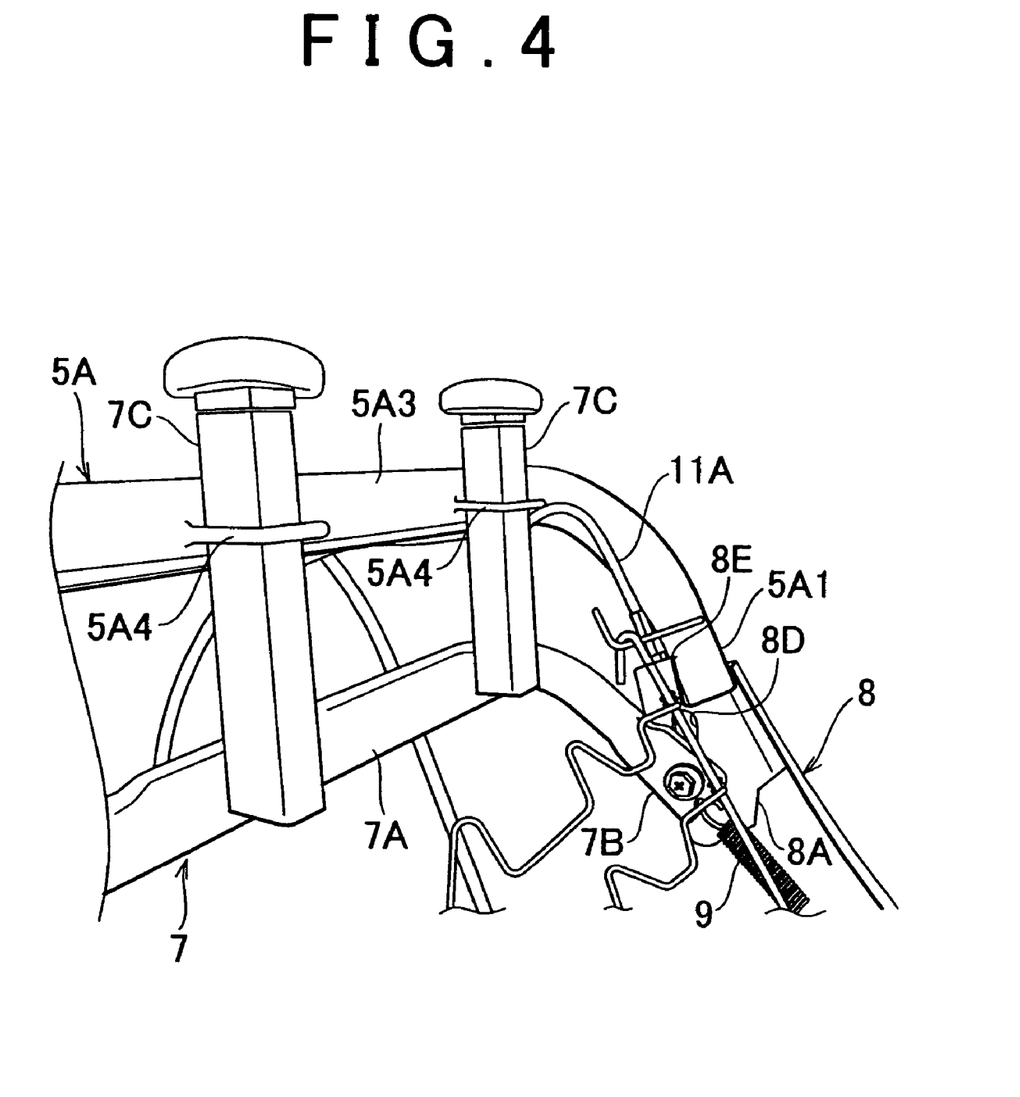
FIG. 4 is a perspective view showing a structure of a portion near headrest supporting brackets in FIG. 3.
Figure 5:
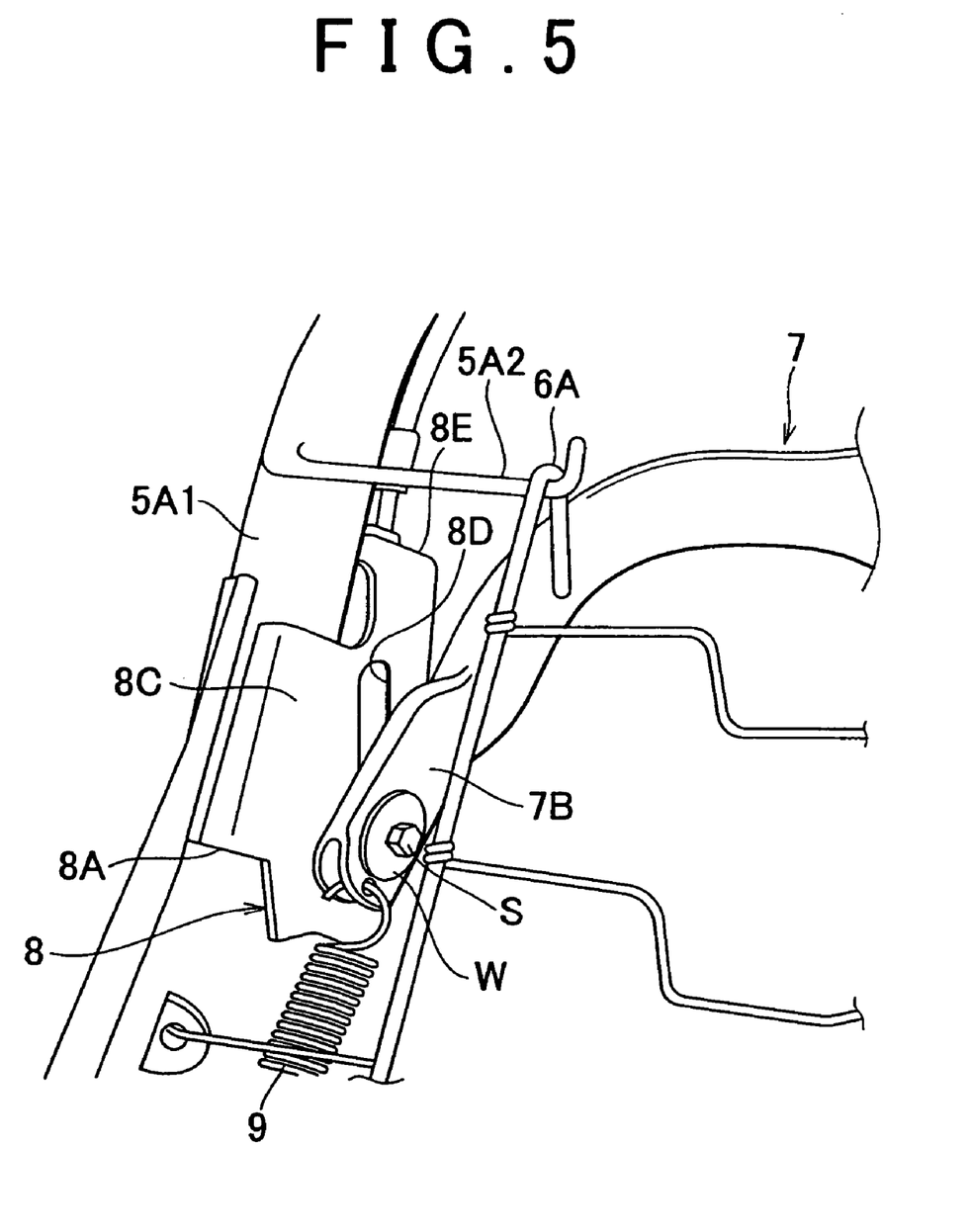
FIG. 5 is a perspective view showing a guide portion in FIG. 3, viewed from the front.

The headrest supporting brackets 7C, 7C protrude upward from the center portion 7A of the headrest frame 7. An upper portion of one of the headrest supporting brackets 7C, 7C is inserted in one of guide rings 5A4, 5A4, which is attached to a front surface of one of lateral pipe portions 5A3, 5A3 of the upper pipe 5A of the seat back frame 5. Similarly, an upper portion of the other headrest supporting bracket 7C is inserted in the other guide ring 5A4 which is attached to a front surface of the other lateral pipe portion 5A3 of the upper pipe 5A of the seat back frame 5 (refer to FIG. 4). The right headrest stay 4A which protrudes from a lower portion of the headrest 4 is inserted in one of headrest supporting brackets 7C, 7C. Similarly, the left headrest stay 4A which protrudes from the lower portion of the headrest 4 is inserted in the other headrest supporting bracket 7C. Thus, the headrest 4 is detachably attached to the headrest frame 7 (refer to FIG. 1).

Both end portions of the headrest frame 7, namely, the right and left flat lower end portions 7B, 7B of the head rest frame 7 are coupled with the seat back frame 5. One of guide portions 8, 8 is arranged between the right lower end portion 7B of the headrest frame 7 and the seat back frame 5. Similarly, the other guide portion 8 is arranged between the left lower end portion 7B of the headrest frame 7 and the seat back frame 5. Thus, the lower end portions 7B, 7B are movable in the vertical direction. As a result, the headrest 4 attached to the headrest frame 7 can be moved in the upward-forward direction, that is, toward the head of the seated user seated in the vehicle seat (refer to FIG. 3). Also, tension springs 9, 9 are provided such that the headrest frame 7 is held at a normal position. One of the tension springs 9, 9 is provided between one of the lower portions 7B, 7B of the headrest frame 7, and one of the side frames 5B, 5B of the seat back frame 5. Similarly, the other tension spring 9 is provided between the other lower portion 7B of the headrest frame 7, and the other side frame 5B of the seat back frame 5.

As shown in FIGS. 3 to 7, each guide portion 8 includes a guide plate 8A and a sliding pin 8B. The guide plate 8A is welded to the vertical pipe portion 5A1 of the upper pipe 5A forming the upper portion of the seat back frame 5. The sliding pin 8B penetrates the flat lower portion 7B of the headrest frame 7, and attached to the lower portion 7B (refer to FIG. 7).

The guide plate 8A has a guide surface 8C overlapped with an outer side surface of the flat lower portion 7B of the headrest frame 7. A guide hole 8D extending in the vertical direction is formed in the guide surface 8C. The sliding pin 8B protrudes outward from the flat lower portion 7B of the headrest frame 7, and slidably penetrates the guide hole 8D formed in the guide plate 8A (refer to FIG. 7). The sliding pin 8B is prevented from being removed by washers W, W. One of the washers W, W is fixed to an inner end portion of the sliding pin 8B by one of set screws S, S, and the other washer W is fixed to an outer end portion of the sliding pin 8B by the other set screw S.

As shown in FIGS. 1 and 2, in an area near the pivot 2A which supports the seat back 3 such that the seat back 3 is tiltable forward/rearward, operating force generating means 10 is provided on a front surface side of a center portion of the lower frame 5C. The center portion is positioned in the center of the lower frame 5C in the horizontal direction. The lower frame 5C forms the lower portion of the seat back frame 5. When the vehicle is rear-ended and the seated user seated in the vehicle seat moves rearward in reaction to the rear-end collision, the operating force generating means 10 receives the load generated by the rearward movement of the lumbar part of the seated user, and generates an operating force. The operating force generating means 10 includes a pressure plate 10A which receives the load generated by the rearward movement of the lumbar part of the seated user, and an operating force generating mechanism 10B which receives the load via the pressure plate 10A.

Figure 8:
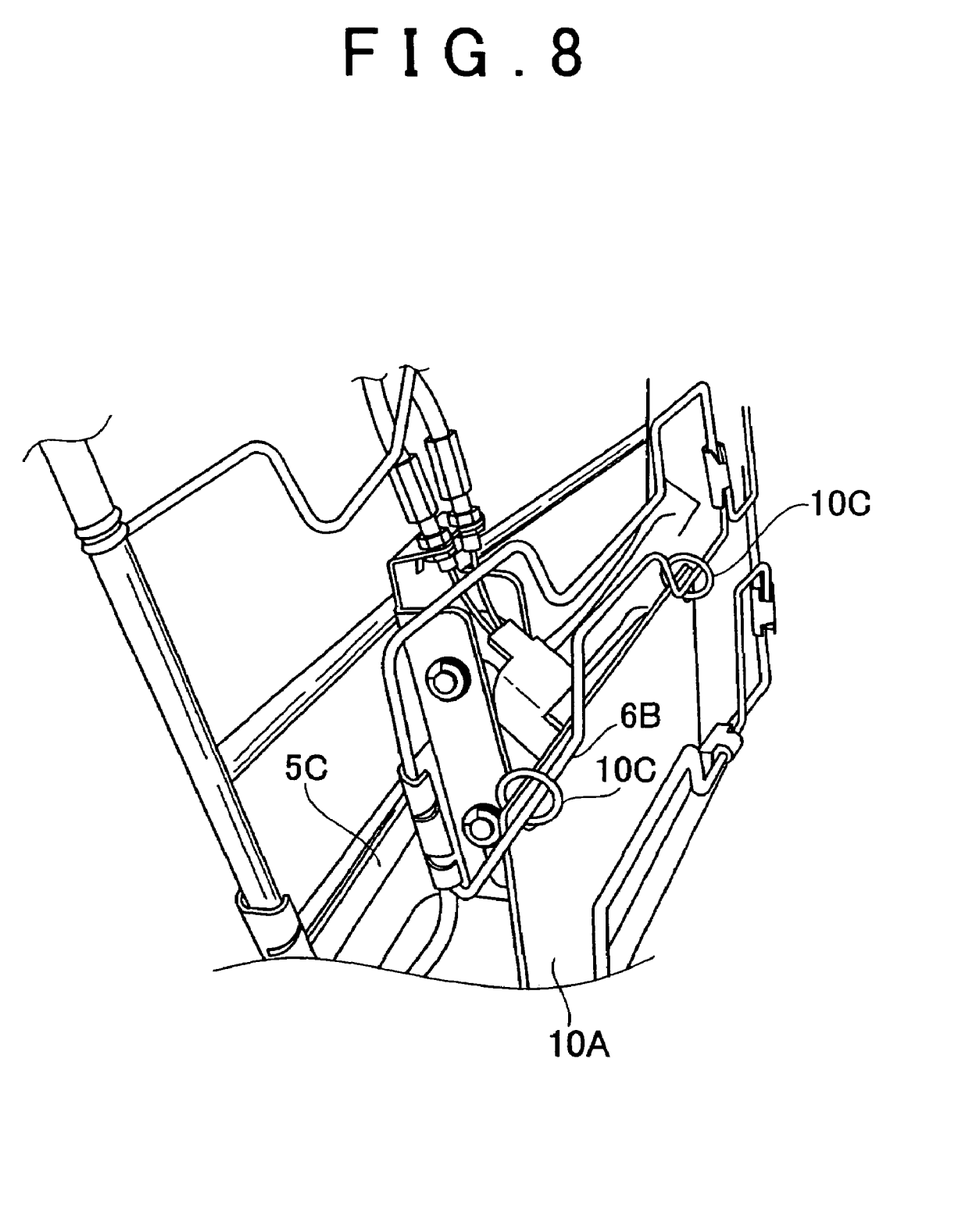
FIG. 8 is a perspective view showing a pressure plate of operating force generating means in FIG. 1, viewed from the front.
Figure 9:
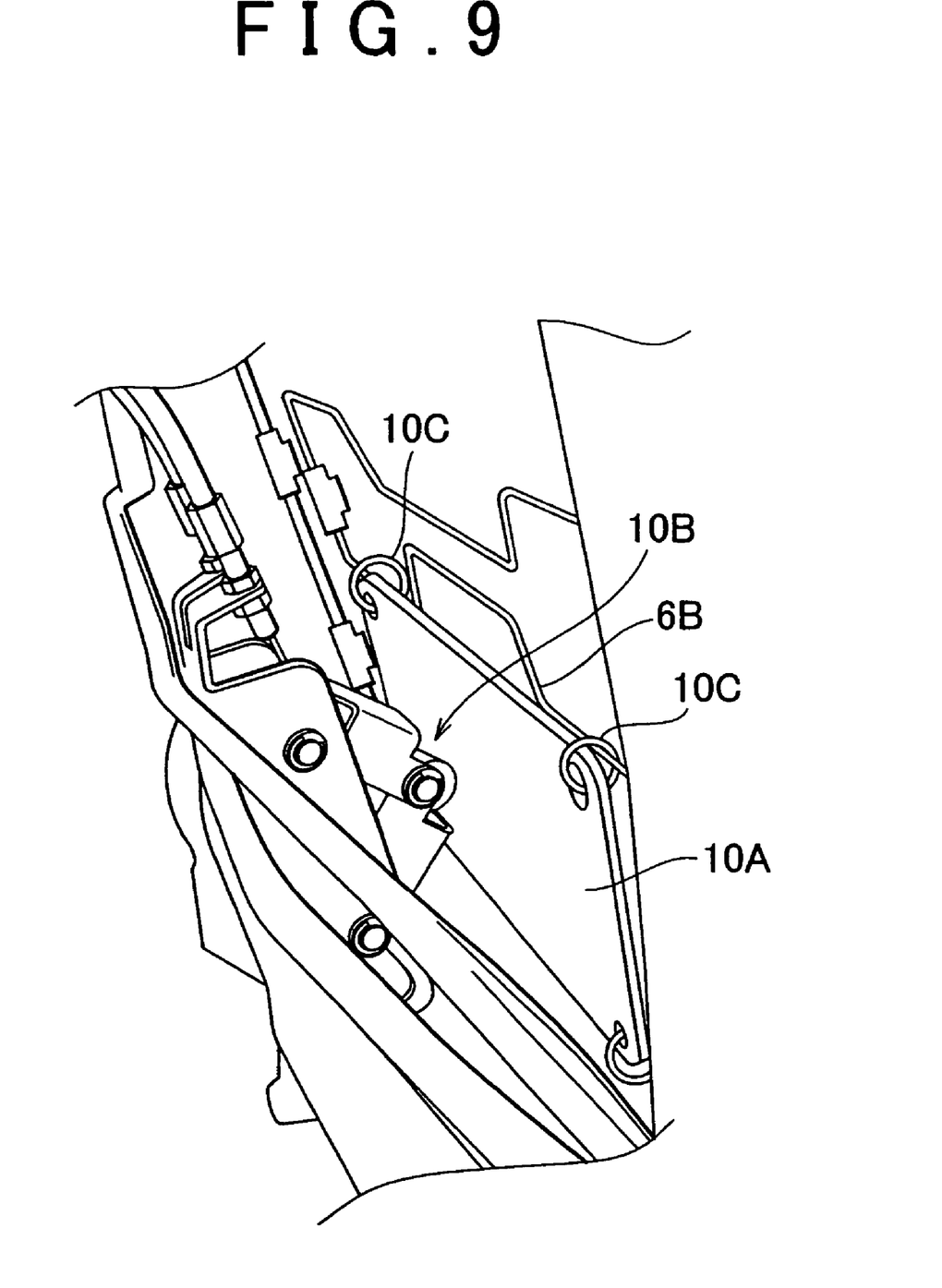
FIG. 9 is a perspective view showing the pressure plate of the operating force generating means in FIG. 1, viewed from the rear.

The pressure plate 10A is formed of, for example, a rectangular synthetic resin plate or metal plate. As shown in FIGS. 8 and 9, the pressure plate 10A is hung, at right and left two upper portions, from a wire 6B of the contour mat 6 by using coupling rings 10C, 10C. The wire 6B extends in the horizontal direction. Meanwhile, the operating force generating mechanism 10B is provided on a vertically long supporting bracket 10D. The supporting bracket has a groove shape whose front side is open. A backboard (reference numeral is omitted) of the supporting bracket 10D is fixed to the front surface of the lower frame 5C by spot welding or the like.

Figure 10:
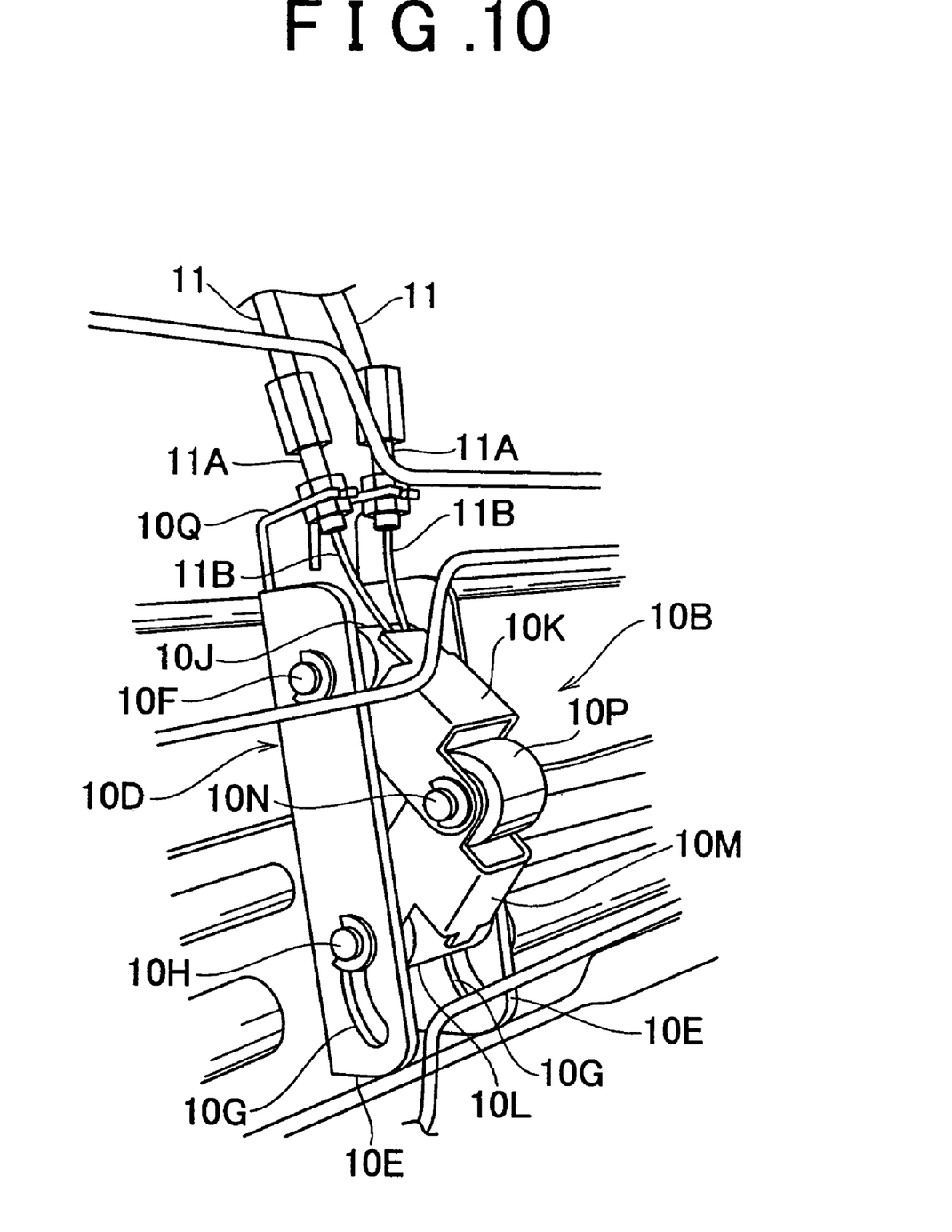
FIG. 10 is a perspective view showing an operating force generating mechanism of the operating force generating means in FIG. 1, viewed from the front.
Figure 11:
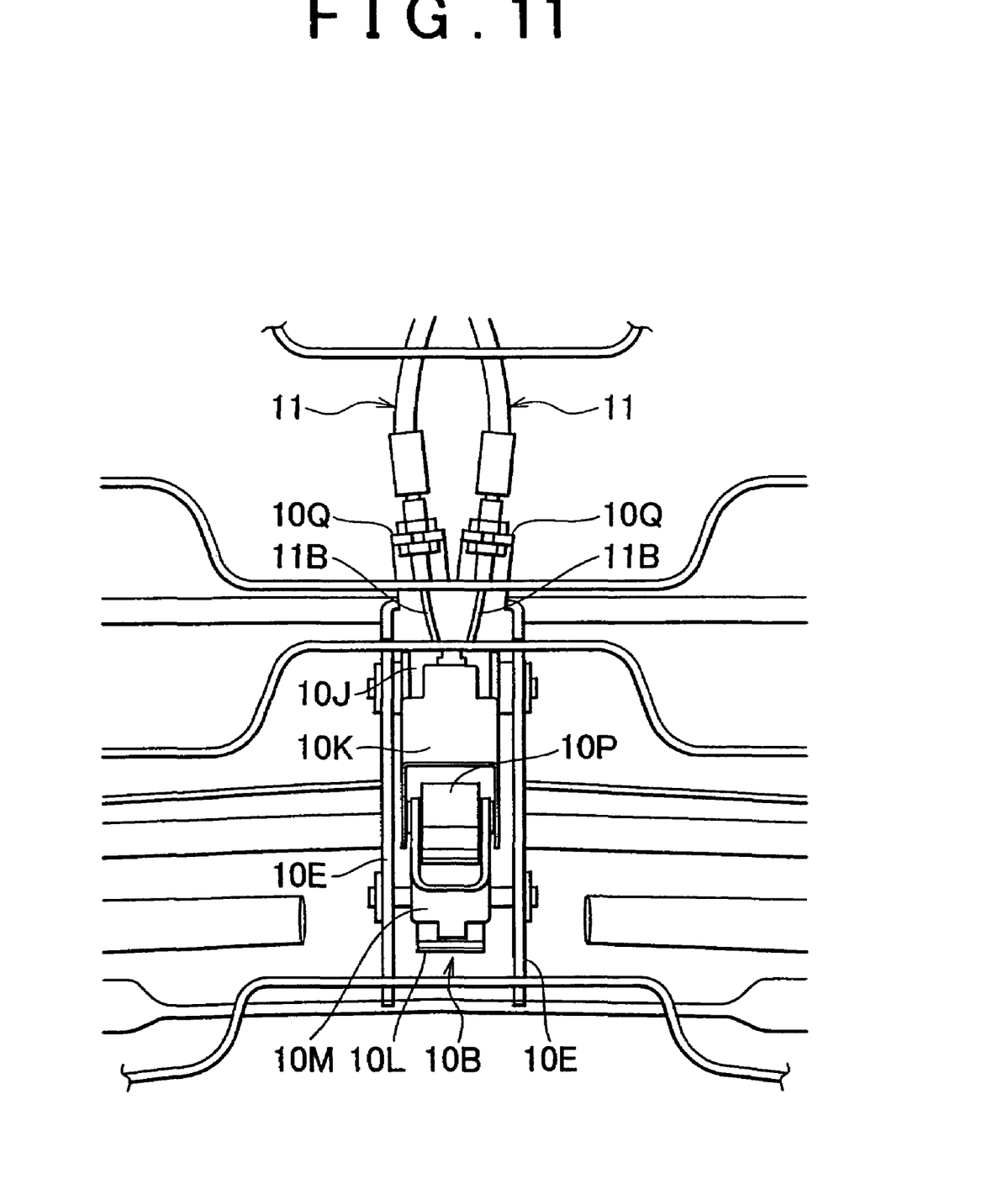
FIG. 11 is a front view showing the operating force generating mechanism of the operating force generating means in FIG. 1.

As shown in FIGS. 10 and 11, the operating force generating mechanism 10B includes a fixed shaft 10F and a movable shaft 10H. The fixed shaft 10F penetrates upper portions of right and left side walls 10E, 10E of the supporting bracket 10D, and are attached to the supporting bracket 10D. The movable shaft 10H penetrates guide holes 10G, 10G. One of the guide holes 10G, 10G is formed in a lower portion of the right side wall 10E, and the other guide hole 10G is formed in a lower portion of the left side wall 10E, the guide holes 10, 10G extending in the vertical direction. The fixed shaft 10F and the movable shaft 10 are attached to the supporting bracket 10D. A fixed roller 10J and an upper end portion of an upper link 10K are rotatably connected to the fixed shaft 10F. A movable roller 10L and a lower end portion of a lower link 10M are rotatably connected to the movable shaft 10H. A lower end portion of the upper link 10K and an upper end portion of the lower link 10M are coupled with each other by using a pivot 10N. A pressure roller 10P is rotatably connected to the pivot 10N.

As shown in FIGS. 1 to 3, paired pulling cable devices 11, 11 are provided as operating force transmitting means. The pulling cable devices 11, 11 move the headrest frame 7 upward in accordance with the operation of the operating force generating mechanism 10B of the operating force generating means 10. The pulling cable devices 11, 11 include outer sheaths 11A, 11A, respectively. One end portion of one of the outer sheaths 11A, 11A is fitted in one of cable stopper pieces 10Q, 10Q. Similarly, one end portion of the other outer sheath 11A is fitted in the other cable stopper piece 10Q. The cable stopper pieces 10Q, 10Q are formed, by bending, in the upper end portion of the supporting bracket 10D (refer to FIGS. 10 and 11).

One of the outer sheaths 11A, 11A is fixed to the cable stopper piece 10Q on the left side at one end portion. The other end portion of this outer sheath 11A is fixed to a cable stopper piece 8E (refer to FIGS. 5 and 6) that is formed, by bending, in the upper end portion of the guide plate 8A of the guide portion 8 on the left side. The position at which the other end portion of the outer sheath 11A is fixed to the cable stopper piece 8E is on the extension of the line which extends in the direction in which the guide hole 8D extends. Similarly, the other outer sheath 11A is fixed to the cable stopper piece 10Q on the right side at one end portion. The other end portion of this outer sheath 11A is fixed to a cable stopper piece 8E (refer to FIG. 6) that is formed, by bending, in the upper end portion of the guide plate 8A of the guide portion 8 on the right side. The position at which the other end portion of the outer sheath 11A is fixed to the cable stopper piece 8E is on the extension of the line which extends in the direction in which the guide hole 8D extends.

Figure 12:
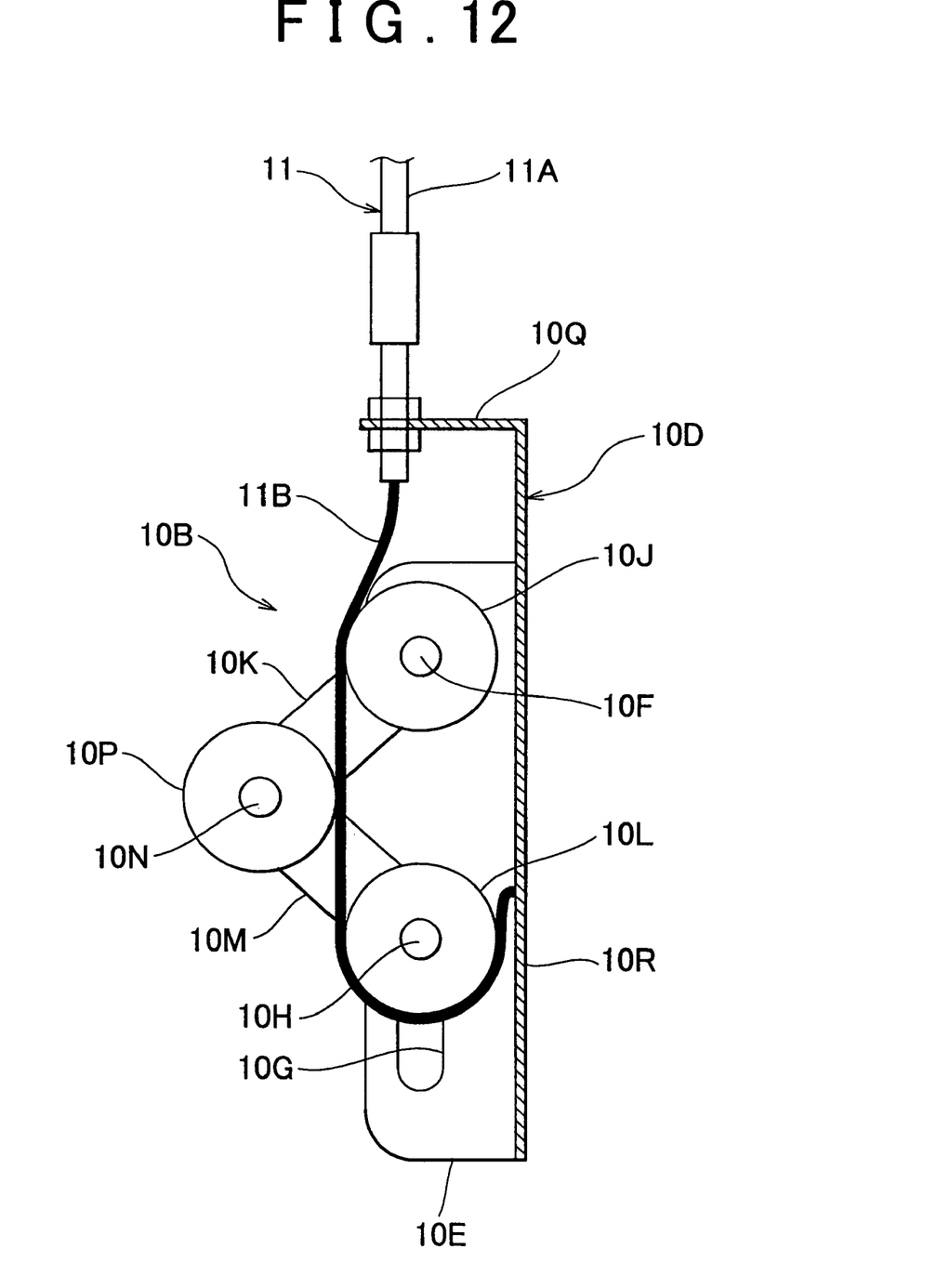
FIG. 12 is a side view schematically showing a structure of the operating force generating mechanism of the operating force generating means in FIG. 1.

One end portion of one of inner cables 11B, 11B, which slidably penetrates one of the outer sheaths 11A, 11A and which comes out of one end portions of this outer sheath 11A, is fixed to a backboard 10R of the supporting bracket 10D. Similarly, one end portion of the other inner cable 11B, which slidably penetrates the other outer sheath 11A and which comes out of one end portion of this outer sheath 11A, is fixed to the backboard 10R of the supporting bracket 10D. The inner cables 11B, 11B are routed on the front surface side of the fixed roller 10J, on the rear surface side of the pressure roller 10P, and on the front surface side of the movable roller 10L, as schematically shown in FIG. 12. The fixed roller 10J, the pressure roller 10P and the movable roller 10L form the operating force generating mechanism 10B.

Figure 6:
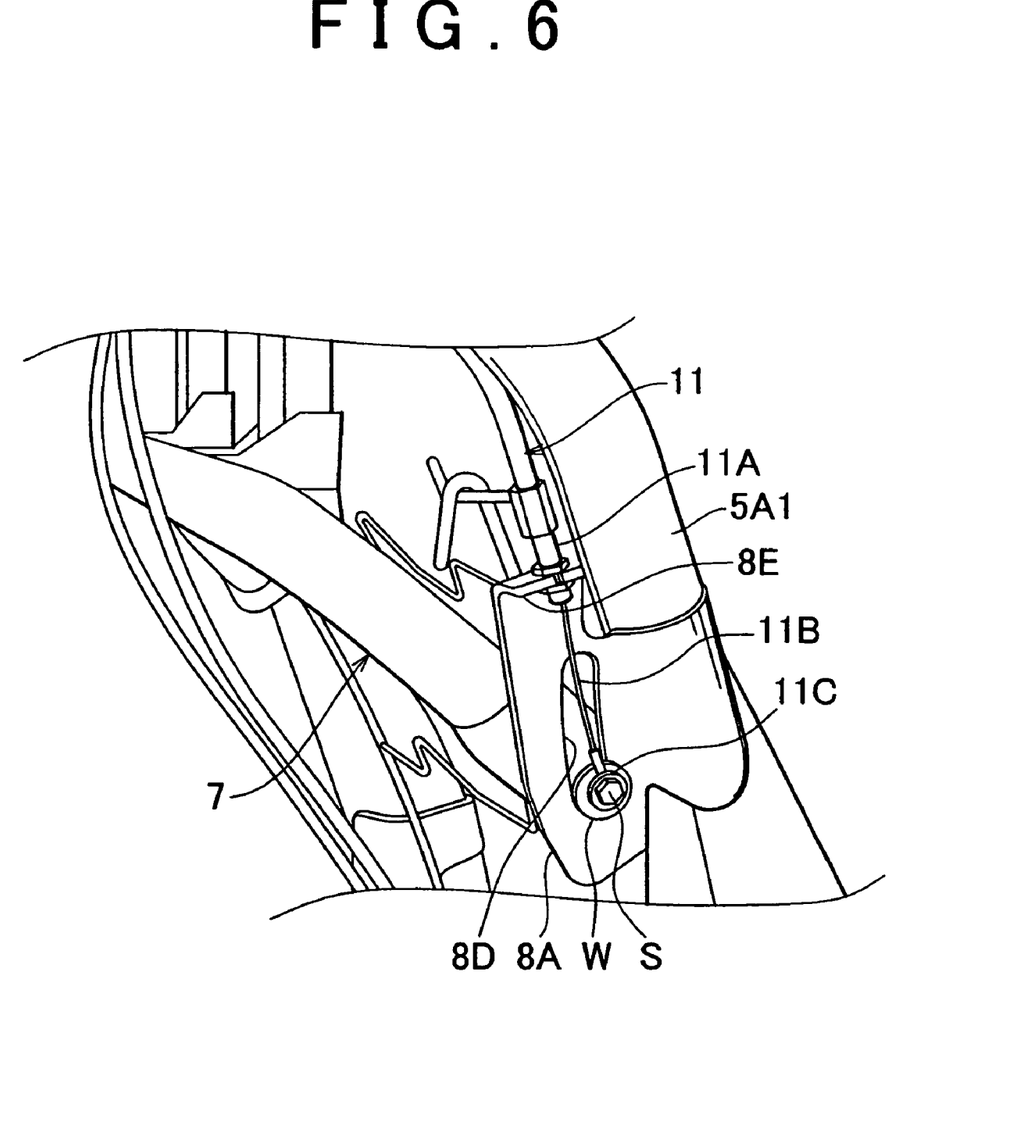
FIG. 6 is a perspective view showing the guide portion in FIG. 3, viewed from the rear.
Figure 7:
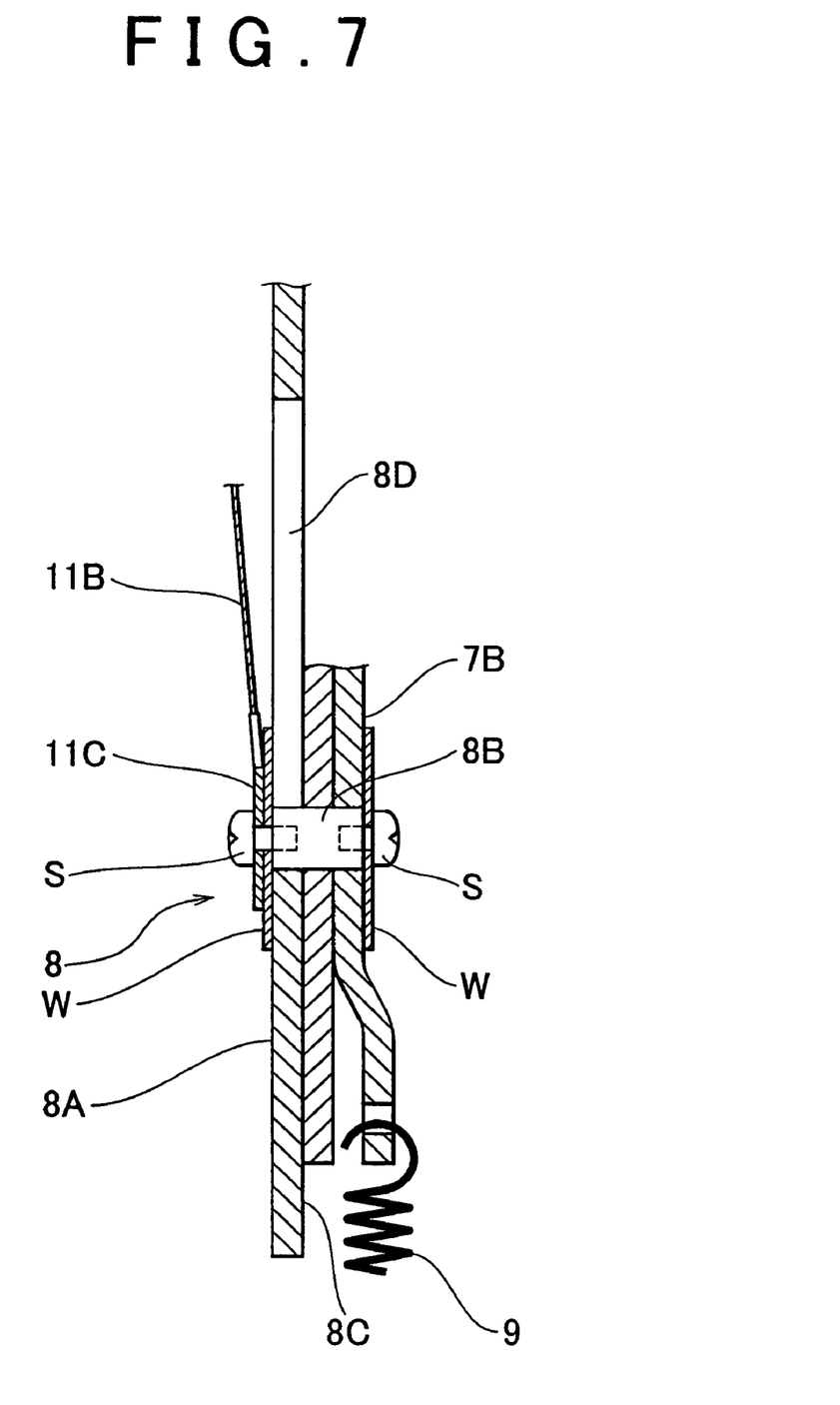
FIG. 7 is a cross sectional view showing a structure of the guide portion in FIG. 3.

Meanwhile, as shown in FIGS. 6 and 7, one of stopper rings 11C, 11C is fixed to the other end portion of one of the inner cables 11B, 11B, which comes out of the other end portion of one of the outer sheaths 11A, 11A. Similarly, the other stopper ring 11C is fixed to the other end portion of the other inner cable 11B, which comes out of the other end portion of the other outer sheath 11A. Each stopper ring 11C is fixed to the sliding pin 8B of the guide portion 8 along with the washer W by the set screw S.

Figure 13:
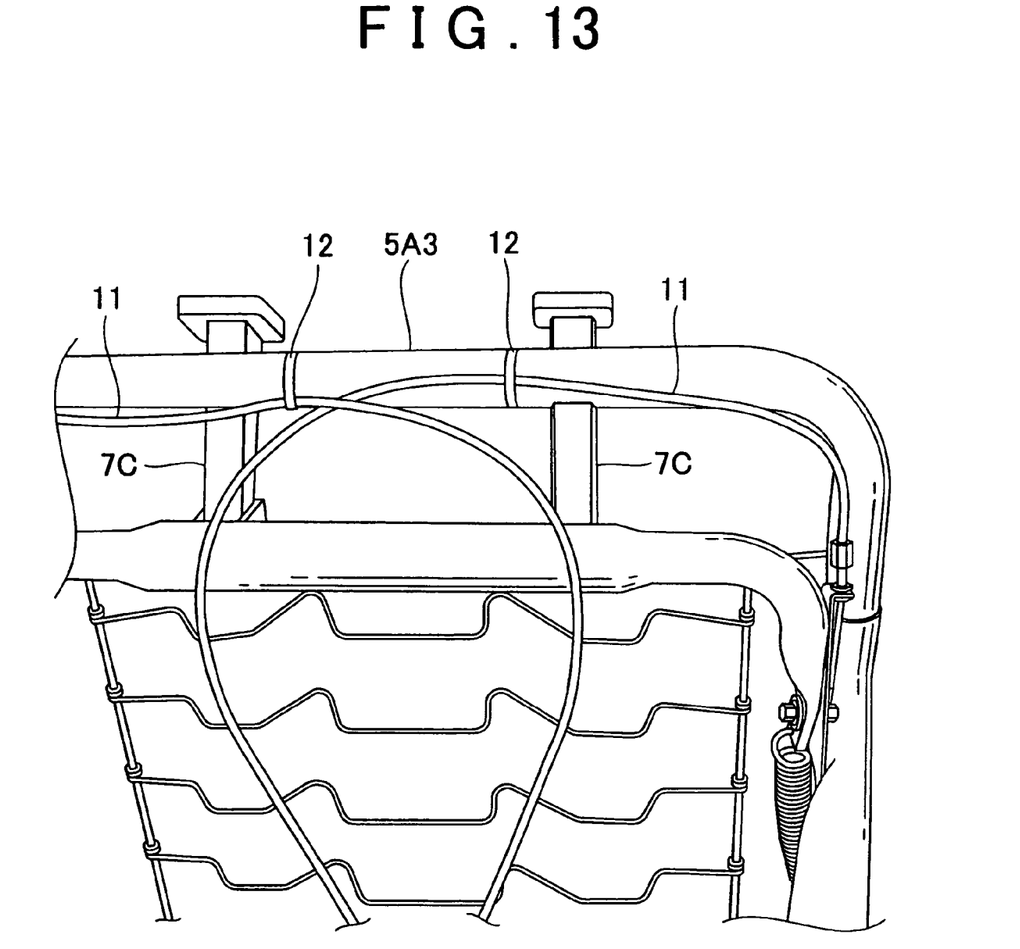
FIG. 13 is a rear view of an upper portion of a seat back frame, showing how pulling cable devices in FIG. 1 are routed.

As shown in FIG. 13, the paired pulling cable devices 11, 11 are routed such that the pulling cable devices 11, 11 cross each other, and each of the pulling cable devices is arranged in a shape with a gentle curvature on the rear surface side of the contour mat 6. Thus, the inner cables 11B, 11B are smoothly operated without being entangled with each other. An upper portion of one of the pulling cable devices 11, 11 is attached to one of the lateral pipe portions 5A3, 5A3 of the upper pile 5A of the seat back frame 5 by one of cable clips 12, 12. Similarly, an upper portion of the other pulling cable device 11 is attached to the other lateral pipe portion 5A3 of the upper pile 5A of the seat back frame 5 by the other cable clip 12.

In the thus configured vehicle seat according to the first embodiment, the headrest 4 is arranged at a position that is slightly apart from the head of the seated user in the rearward direction, when the seated user has his/her back against the seat back 3, that is, when the seated user is in the normal seated posture. When the seated user is in such a normal seated posture, if the vehicle is rear-ended and the lumbar part of the seated user moves rearward in reaction to the rear-end collision, the pressure plate 10A of the operating force generating means 10 embedded in the seat back 3 is moved rearward due to the load generated by the rearward movement of the seated user.

Figure 14:
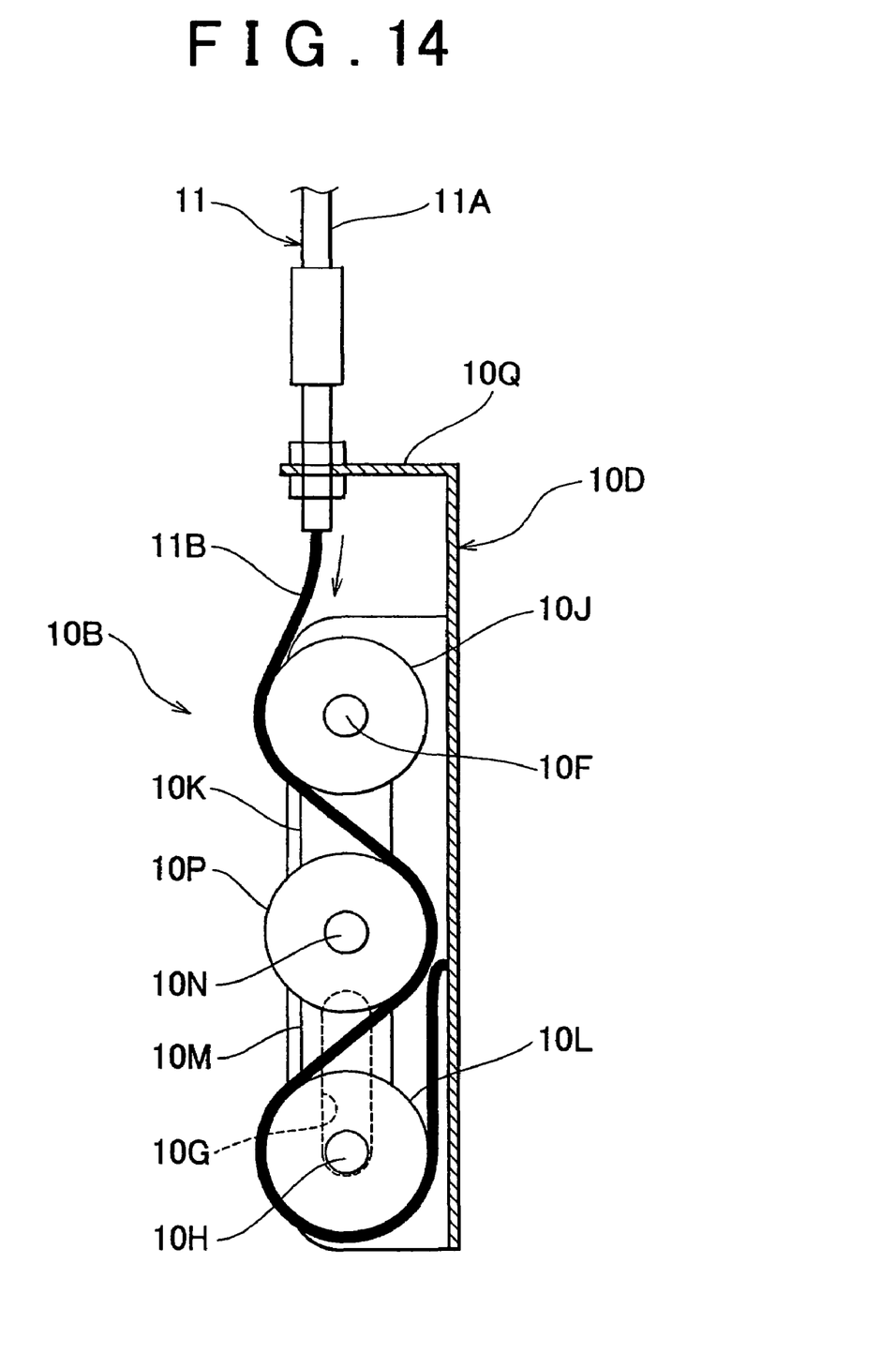
FIG. 14 is a side view schematically showing an operation state of the operating force generating mechanism in FIG. 12.

When the pressure plate 10A is moved rearward, the pressure roller 10P of the operating force generating mechanism 10B provided immediately behind the pressure plate 10A is pressed from the normal portion shown in FIG. 12 to the operation position shown in FIG. 14. In accordance with this movement, the movable roller 10L is moved to the downslide position shown in FIG. 14. As a result, the inner cables 11B, 11B, which come out of the one end portions of the respective pulling cable devices 11, 11 and which are placed on the pressure roller 10P and the movable roller 10L largely deflect, and are pulled in the direction shown by an arrow.

When the inner cables 11B, 11B are pulled, each sliding pins 8B of the guide portion 8, which is coupled with the other end portion of the corresponding inner cable 11B by using the stopper ring 11C moves upward along the guide hole 8D (refer to FIG. 7). In accordance with this movement, the lower end portions 7B, 7B smoothly move upward in a balanced manner against the spring tension of the tension springs 9, 9 (refer to FIGS. 4 and 5). One of the lower end portions 7B, 7B is positioned at the right end portion of the headrest frame 7, and the other lower end portion 7B is positioned at the left end portion of the headrest frame 7. As a result, the headrest frame 7 is smoothly moved upward along with the headrest supporting brackets 7C, 7C, and the headrest supporting brackets 7C, 7C move upward while being guided by the respective guide rings 5A4, 5A4, whereby the headrest 4 attached to the headrest supporting brackets 7C, 7C is instantaneously moved in the upward-forward direction, that is, toward the head of the seated user smoothly and reliably. One of the headrest stays 4A, 4A is arranged between the headrest 4 and one of the headrest supporting brackets 7C, 7C. Similarly, the other headrest 4A is arranged between the headrest 4 and the other headrest supporting bracket 7C.

With the vehicle seat according to the first embodiment, when the vehicle is rear-ended, the head rest 4 can be instantaneously moved in the upward-forward direction, that is, toward the head of the seated user smoothly and reliably. It is therefore possible to reliably reduce the impact on the neck of the seated user.

What is claimed is:

1. A vehicle seat, comprising:
   a seat back frame;
   headrest supporting brackets which are provided in a center portion of the seat back frame, and to which a headrest is attached;
   a headrest frame which is supported by the seat back frame at at least two coupling portions such that the headrest is movable in a direction in which the headrest is moved closer to a head of a seated user;
   an operating force generating device which generates an operating force when receiving a load generated by a rearward movement of the seated user; and
   an operating force transmitting device which applies the operating force to the at least two coupling portions of the headrest frame in accordance with an operation of the operating force generating device, thereby moving the headrest frame,
   wherein the operating force transmitting device is formed of paired pulling cable devices, and guide portions that guide the headrest frame in a direction in which the headrest frame is moved are formed in the respective coupling portions, and wherein each of one end portions of outer sheaths of the paired pulling cable devices, the one end portions facing respective end portions of the headrest frame, is positioned on an extension of a line that extends in a direction in which the guide portion guides the headrest frame.

2. The vehicle seat according to claim 1, wherein the coupling portions are provided at respective end portions of the headrest frame.

3. The vehicle seat according to claim 1, wherein a direction in which the headrest frame is moved is an upward direction.

4. The vehicle seat according to claim 1, wherein guide portions that guide the headrest frame in a direction in which the headrest frame is moved are formed in the respective coupling portions.

5. The vehicle seat according to claim 1, wherein the operating force generated by the operating force generating device is converted into a pulling force by the paired pulling cable devices.

6. The vehicle seat according to claim 1, wherein the pulling cable devices are routed such that the pulling cable devices cross each other, and each of the pulling cable devices is arranged in a shape with a gentle curvature.

7. A vehicle seat, comprising:
a seat back frame;
headrest supporting brackets which are provided in a center portion of the seat back frame, and to which a headrest is attached;
a headrest frame which is supported by the seat back frame at at least two coupling portions such that the headrest is movable in a direction in which the headrest is moved closer to a head of a seated user;
operating force generating means for generating an operating force when receiving the load generated by a rearward movement of the seated user; and
operating force transmitting means for applying the operating force to the at least two coupling portions of the headrest frame in accordance with an operation of the operating force generating means, thereby moving the headrest frame, wherein the operating force transmitting means is formed of paired pulling cable means, and guide portions that guide the headrest frame in a direction in which the headrest frame is moved are formed in the respective coupling portions, and wherein each of one end portions of outer sheaths of the paired pulling cable means, the one end portions facing respective end portions of the headrest frame, is positioned on an extension of a line that extends in a direction in which the guide portion guides the headrest frame.

\* \* \* \* \*